J. FAIRCHILD.
Hose-Attachments.

No. 153,060.

Patented July 14, 1874.

Witnesses:
Luther Williams
Henry C. Briggs

Inventor:
John Fairchild

UNITED STATES PATENT OFFICE.

JOHN FAIRCHILD, OF KALAMAZOO, MICHIGAN.

IMPROVEMENT IN HOSE ATTACHMENTS.

Specification forming part of Letters Patent No. 153,060, dated July 14, 1874; application filed January 12, 1874.

*To all whom it may concern:*

Be it known that I, JOHN FAIRCHILD, of Kalamazoo, State of Michigan, have invented a machine or attachment to prevent the bursting of fire-engine and other hose by reason of obstruction by stone, ice, or other hard substances, and to facilitate the changing of nozzles in case of obstruction, and removing the obstruction, of which the following is a specification:

The object of my invention is to facilitate the removal of stones, ice, and other hard substances from fire-engine and other hose used for conducting and forcing water, and from nozzles attached to such hose, and to prevent their bursting by reason of such obstruction.

Figure 1:
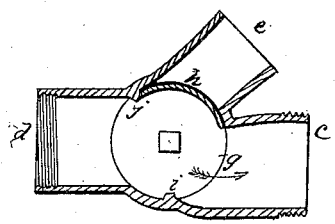
Fig. 1 represents section through the cylinder when in work, $c$ being connection with nozzle; $d$, connection with hose; $e$, discharge of obstruction; $g$, valve open when no obstruction; $h$, valve for opening or closing discharge $e$, or the flow into the nozzle, as desired; $i$ and $j$, valve-stops.
Figure 2:
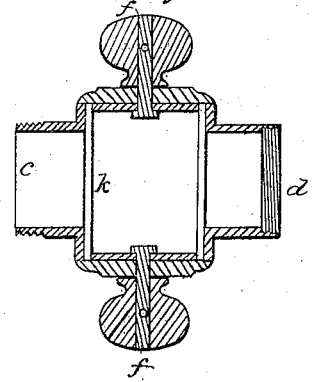
Fig. 2 shows section through the cylinder and connection of thumb-screw with valve, $c$ being connection with nozzle; $d$, connection with hose; $f$, thumb-screw; $k$, valve used in turning flow of water through nozzle or discharge, as desired.
Figure 3:
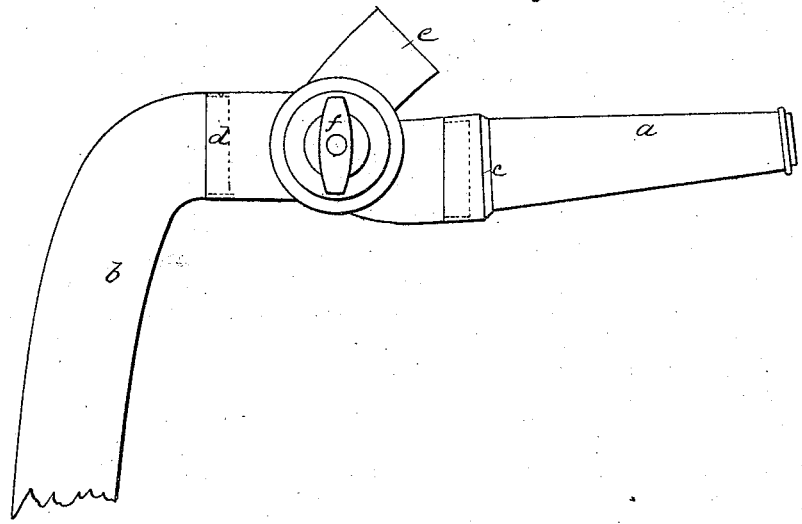
Figure 3 represents the machine or attachment connected with the hose and nozzle, $a$ being the nozzle; $b$, section of hose; $c$, connection of nozzle with machine or attachment; $d$, connection of hose with machine or attachment; $e$, discharge in case of obstruction; $f$, thumb-screw, for turning valve to allow flow through nozzle or discharge $e$, as desired.

When water is being forced through hose, and there is no obstruction, the valve is turned, by means of the thumb-screw, so as to close discharge $e$, and allow a free flow through the nozzle; and in case of obstruction, the valve is turned, closing the flow through the nozzle and opening the discharge $e$, and allowing it so to flow until the nozzle can be removed and another put in its place, when valve is again moved, closing discharge $e$, and opening the flow through the nozzle.

I do not claim, broadly, a hose attachment with two discharge-necks, either of which may be closed at will, as I am aware that this is not new. My improvement consists in the use of a valve concealed within the case of the attachment, so that neither it nor its seats are liable to injury from the rough handling they are necessarily subjected to.

What I claim as my invention, and desire to secure by Letters Patent, is—

The combination of the case, having an induction-neck, $d$, and two discharge-necks, $c$ and $e$, with the segmental valve $h$, concealed within the case, and operated by exterior knobs or thumb-pieces $f$, substantially as and for the purpose specified.

JOHN FAIRCHILD.

Witnesses:
LUTHER WILLIAMS,
HENRY C. BRIGGS.